April 8, 1969

E. B. RICHARDSON 3,436,773

COMBINATION BOAT AND TRAILER

Filed Aug. 15, 1967

INVENTOR
EZRA B. RICHARDSON 3,436,773
COMBINATION BOAT AND TRAILER
Ezra B. Richardson, 2709 Capitol St., Rte. 1,
Warren, Mich. 48091
Filed Aug. 15, 1967, Ser. No. 660,706
Int. Cl. B63c 13/00, 15/00
U.S. Cl. 9—1                                    2 Claims

ABSTRACT OF THE DISCLOSURE

This invention relates to boats as well as to trailers, and more particularly, to a boat that is provided with both a pair of retractable wheels and removable structure that is secured to the front end of the boat as well as providing a support for the front end of the boat when the structure is secured to the rear end of a vehicle for towing the boat from one place to another.

---

This invention consists of a small boat of the rowboat or outboat type or an outboard motor boat having a retractable wheel mounted on each side of the rear portion of the boat and retractable by means of a single hand operated lever that is secured to the lateral center of the supporting rod of the wheels. The just mentioned rod is located inside of the boat with each end passing out through a bearing and seal arrangement on each side of the boat. A swingably mounted arm is located on each end of the rod with the lower end of each arm carrying a cantilever axle on which a wheel is mounted. The front end of the keel of the boat is provided with removable structure adapted to be secured to the rear end of a vehicle that will tow the boat to and from the water. The structure embodies both a removable pin that passes through the keel of the boat and a standard trailer hitch that will firmly secure the front of the boat to the structure. A stand is swingably secured to the structure in order that it may support the same when the towing vehicle has been uncoupled from the structure.

It is the principal object of this invention to provide a combination boat and trailer that will not require a separate and costly trailer for moving the boat from one place to another.

Another object of this invention is to provide a combination boat and trailer of the character described that will contain its own supporting wheels which are retracted when the boat is in the water.

Still another object of this invention is to provide a combination boat and trailer that can be secured to the rear end of any vehicle for towing the boat to and from the water.

Other and further objects and advantages of this invention will become apparent as the reading of the specification and its appended claims proceeds and the accompanying drawing is examined.

In the drawing.

In the several views of the drawing, like parts are indicated by like reference numbers.

Figure 1:
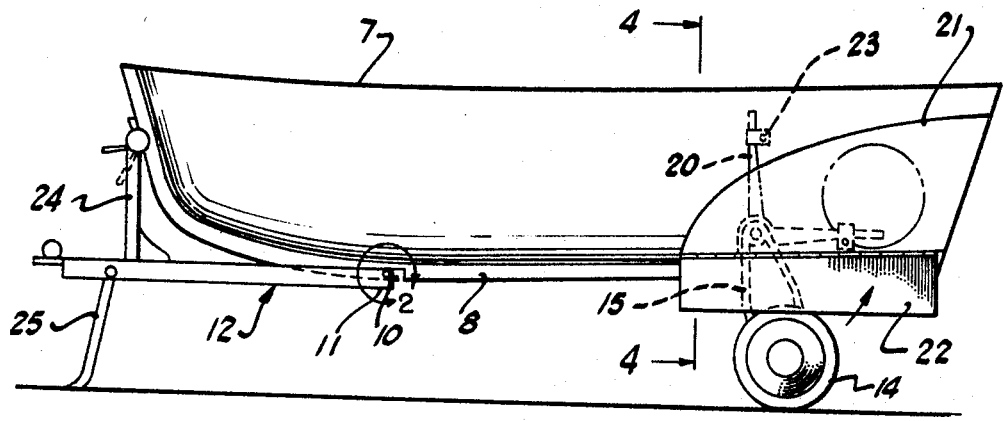
FIG. 1 is a side view of this invention, ready to be secured to the rear end of a vehicle.
Figure 2:
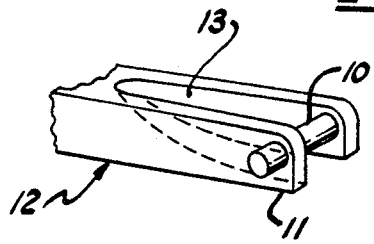
FIG. 2 is a pictorial view of that portion of this invention that is enclosed within the arrowed circle and indicated by the numeral 2 in FIGURE 1. No part of the boat is shown in this view.
Figure 3:
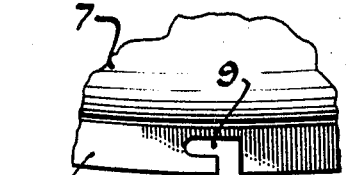
FIG. 3 is an enlarged side view of that portion of the boat that is secured in that portion of the invention detailed in FIGURE 2.

Looking at FIGURE 1 of the drawing, it will be seen that the reference number 7 indicates a boat having a keel 8 in the forward portion of which is an L-shaped opening 9, adapted to receive the movable pin 10 that is slidably located in the rear end 11 of the trailer hitch 12, that has its front end adapted to securement to the rear end of a vehicle. The aforesaid rear end 11 of the trailer hitch 12 is provided with a U-shaped recess 13 in which rests a portion of the aforesaid keel 8 of the boat when the boat is being towed by a vehicle.

Figure 4:
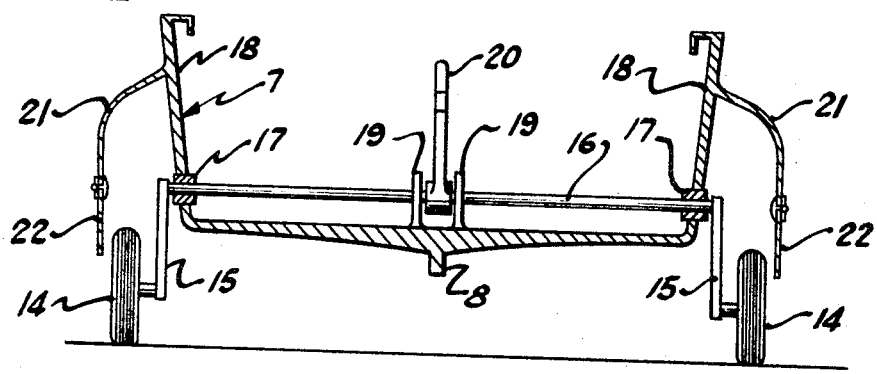
FIG. 4 is a sectional view of this invention, taken substantially along line 4—4 of FIGURE 1, and viewed in the direction indicated by the arrows.

Continuing to look at FIGURE 1, it will be noted that the rear or stern of the aforesaid boat 7 is provided with a retractable wheel 14 on each side thereof. Each wheel is mounted on an axle that projects outward from the outer end of an arm 15 which has its upper end secured to the outer end of the rod 16, which extends laterally across the bottom and inside of the aforesaid boat 7. The rod 16, which is round in cross-section, has each end projecting out through a water tight bearing 17 that is located in each side 18 of the boat. The rod 16 is supported in the lateral center of the boat by means of two equally spaced and parallel bearing blocks 19. Between the two bearing blocks is the lower end of the vertically disposed hand lever 20 that is secured to the aforesaid rod 16 for the purpose of rotating the bar, thereby retracting or lowering the two wheels 14 which are protected when in the retracted position, shown in phantom lines in FIGURE 1 of the accompanying drawing, by means of the shields 21 which are made integral with the sides 18 of the boat. The lower edge of each shield 21 is provided with a hinged panel 22 that permits inspection, and maintenance if necessary, of the upper end of each arm 15 and its associated structure or parts. The upper end of the aforesaid hand lever 20 is provided with a suitable locking mechanism 23 that will firmly secure the wheels 14 in their desired position. This just described structure of the wheels and their associated mechanism is clearly shown in FIGURES 1 and 4 of the accompanying drawing.

Returning now to the aforesaid trailer hitch 12, it will be seen from examination of FIGURE 1 of the accompanying drawing that this part of my invention is provided with a vertically disposed member 24 that is part of the trailer hitch 12, the upper end of the aforesaid member 24 being provided with a hand operated mechanism that will secure and lock the bow of the boat 7 to this part of its supporting structure. A stand 25 is swingably secured to the trailer hitch 12 just in front of the aforesaid member 24. The purpose of the stand being to provide support for the trailer hitch and boat when it is removed from its towing vehicle.

In reading this specification and its appended claims and examining the accompanying drawing, it should be remembered that the trailer hitch, as applied to this invention, embodies all of the removable structure forward of the L-shaped opening 9 in the keel of the boat.

What I now claim as new and desire to secure by Letters Patent is:

1. A combined boat and trailer of the character described, comprising a boat, an elongated substantially horizontal member, a trailer hitch secured to the one end of said elongated member, the hitch adapted to be secured to the rear end of a vehicle, the keel of the boat being provided with an L-shaped notch near the front thereof, the other end of the elongated member having a U-shaped recess in which a portion of the keel rests, a removable pin passing through the elongated member across the recess at the outer end thereof which pin also passes through the L-shaped notch, a vertically disposed member secured to the elongated member near the said one end, hand operated mechanism secured to the upper end of said vertical member, said mechanism adapted to secure the upper end of said vertical member to the bow of the boat, a swingably mounted stand secured to the elongated member, said boat also being provided with a retractable wheel that is swingably mounted on each side thereof and near the stern of the said boat, the wheels supporting the stern portion of the said boat while it is being towed, each of the wheels is protected by a shield that extends outward and downward from each side of the said boat, each shield having a hinged panel on the lower edge thereof that permits inspection and maintenance of the wheel supporting structure.

2. The invention of claim 1, wherein each wheel is mounted on the outer end of an axle that is secured to the lower end of an arm that has its upper end secured to the outer end of a rod that extends laterally across the bottom of the inside of the said boat, the said ends of the said rod projecting through water tight bearings in the sides of the said boat, the center portion of the said rod being supported by two equally spaced and parallel bearing blocks that have a hand operated lever secured to the said rod and between the said bearing blocks, the said lever providing a means of retracting and lowering the said wheels.

References Cited

UNITED STATES PATENTS

| | | |
|---|---|---|
| 2,509,067 | 5/1950 | Leach. |
| 2,522,616 | 9/1950 | Husek. |
| 3,262,139 | 7/1966 | Campbell. |
| 3,283,347 | 11/1966 | Martin. |

TRYGVE M. BLIX, *Primary Examiner.*